United States Patent
Hirai et al.

(10) Patent No.: US 10,739,267 B2
(45) Date of Patent: Aug. 11, 2020

(54) OPTICAL APPARATUS AND OPTICAL MEASUREMENT METHOD

(71) Applicant: HITACHI, LTD., Tokyo (JP)

(72) Inventors: Kakuro Hirai, Tokyo (JP); Manabu Shiozawa, Tokyo (JP); Takao Watanabe, Tokyo (JP)

(73) Assignee: HITACHI LTD., Tokyo (JP)

( * ) Notice: Subject to any disclaimer, the term of this patent is extended or adjusted under 35 U.S.C. 154(b) by 267 days.

(21) Appl. No.: 15/791,887

(22) Filed: Oct. 24, 2017

(65) Prior Publication Data

US 2018/0128748 A1 May 10, 2018

(30) Foreign Application Priority Data

Nov. 7, 2016 (JP) ................................. 2016-217340

(51) Int. Cl.
*G01N 21/65* (2006.01)
*G01J 3/44* (2006.01)
*G02B 21/00* (2006.01)

(52) U.S. Cl.
CPC ............... *G01N 21/65* (2013.01); *G01J 3/44* (2013.01); *G02B 21/004* (2013.01); *G02B 21/008* (2013.01)

(58) Field of Classification Search
CPC ............. G01N 21/65; G01N 2021/653; G02B 21/004; G02B 21/008
See application file for complete search history.

(56) References Cited

U.S. PATENT DOCUMENTS

| | | | | |
|---|---|---|---|---|
| 2017/0322146 | A1* | 11/2017 | Murayama | G01N 21/65 |
| 2017/0352525 | A1* | 12/2017 | Ikegami | G01N 27/62 |

FOREIGN PATENT DOCUMENTS

WO 2016/143084 A1 9/2016

OTHER PUBLICATIONS

X. Huang et. al, Spontaneous and coherent anti-Stokes Raman spectroscopy of human gastrocnemius muscle biopsies in CH-stretching region for discrimination of peripheral artery disease, Biomedical Optics Express, vol. 6 No. 8 2766-2777 (2015).

T. Ichimura et. al, Visualizing the appearance and disappearance of the attractor of differentiation using Raman spectral imaging, Scientific Reports, pp. 1-10, Jun. 16, 2015.

* cited by examiner

*Primary Examiner* — Hina F Ayub
(74) *Attorney, Agent, or Firm* — Volpe and Koenig, P.C.

(57) ABSTRACT

Exemplary embodiments of the present disclosure relate to providing an optical apparatus that is capable of acquiring representative Raman spec trams with high reliability from hyper spectrum images of samples. An optical apparatus according to this disclosure: receives a specifying input that specifies a specific Raman spectrum bandwidth as a reference signal; and extracts a Raman spectrum for a measurement point where an intensity of the reference signal is at or above a reference intensity.

14 Claims, 11 Drawing Sheets

|  | | evaluation result | | | |
|---|---|---|---|---|---|
|  |  | A | B | C | sum |
| true state | A | 80 | 15 | 5 | 100 |
|  | B | 30 | 60 | 10 | 100 |
|  | C | 10 | 10 | 80 | 100 |
|  | sum | 120 | 85 | 95 | |

OPTICAL APPARATUS AND OPTICAL MEASUREMENT METHOD

CROSS REFERENCE TO RELATED APPLICATIONS

The present application claims priority from Japanese patent application JP 2016-217340 filed on Nov. 7, 2016, the content of which is hereby incorporated by reference into this application.

BACKGROUND

Technical Field

The present disclosure re hues to optical apparatuses that utilize Raman scattering.

Background Art

In recent years, Raman microscopes have been drawing attentions in the medical and biology fields. Raman microscopes are capable of acquiring qualitative information of samples noninvasively and with no contact. In these technical fields, biological tissues are observed as samples typically by coloring those tissues and by using fluorescence microscopes. However, it is difficult to continuously observe same biological tissues due to effect of coloring. Thus noninvasive observation method has been required.

Raman microscope observes Raman scattering light among scattering light that is generated by irradiating excitation laser light onto the sample. Raman scattering light includes frequency shifts with respect to the excitation light. The frequency shift included in Raman scattering light is referred to as Raman shift. The amount of Raman shift depends on energy difference between vibrational levels of chemical bonds that are distributed around the portion on which the laser is irradiated. Therefore, by varying the laser irradiation portion and by acquiring Raman spectrums at multiple positions on the sample, it is possible to acquire information on molecular species of the sample and distribution thereof, noninvasively and with no contact. The aggregated data of spectrums acquired at each laser irradiation portion is referred to as hyper spectrum image.

In typical Raman scattering referred to as spontaneous Raman scattering, the Raman scattering light is significantly weak and long time is necessary for measurement. Thus it has been difficult to use Raman microscope for biological tissues which temporal variation is significant.

Due to short pulse lasers with high performance developed in recent years, techniques in microscopes have been developed that use nonlinear optical effects. Also in Raman microscopes, CARS (Coherent Anti-Stokes Raman Scattering) or SRS (Stimulated Raman Scattering) have been developed in which signal, intensities are increased by using nonlinear optical effects. These nonlinear Raman microscopes base reduced measurement times. Thereby it has been possible to observe biological tissues using Raman microscopes.

When evaluating biological tissues using Raman microscopes, the biological tissues may be evaluated by extracting for each sample one spectrum (hereinafter, referred to as representative Raman spectrum) representing characteristics of the sample, and by performing spectrum analysis on the extracted spectrum. In conventional techniques for such cases; the shape of die biological tissue is identified from the bright field image; pixels are selected at the measured position or in the hyper spectrum image; a Raman spectrum at the position is used as the representative Raman spectrum (Non Patent Documents 1 and 2 below).

Patent Document 1 listed below describes that power intensity ratios of excitation light and multiplication states are adjusted to adjust signal intensities of desired Raman spectrum bandwidths.

RELATED ART DOCUMENTS

Patent Documents

Patent Document 1: WO2016/143084 A1

Non Patent Documents

Non Patent Document 1: X. Huang, et al., "Spontaneous and coherent anti-Stokes Raman spectroscopy of human gastrocnemius muscle biopsies in CH-stretching region for discrimination of peripheral artery disease," OSA Vol. 6 No. 8 2766-2777 (2015)

Non Patent Document 2: T. Ichimura, et al., "Visualizing the appearance and disappearance of the attractor of differentiation using Raman spectral imaging," Scientific report 5 (2015)

SUMMARY

In biological tissues, a plurality of organelles and water are complicated mixed. In addition, even in a single organelle, materials such as protein are distributed. Accordingly, it is difficult to completely identify the structure of the biological tissue from the bright field image. Further, since Raman spectrums depend on distribution of materials at the measured position, the spectrum shapes are different from each other for each of organelles. In addition, at portions where water is the main component which does not have Raman scattering light derived from living body, the signal intensities are small. Therefore, by using a method that subjectively selects measurement points and that extracts Raman spectrums at the measure mem points as representative Raman spectrum, such as described in Non Parent Documents above, a representative Raman spectrum may be extracted that has shapes or signal intensities which do not sufficiently reflect the characteristics of the biological tissue.

The technique described in Patent Document 1 describes a method for adjusting signal intensities of Raman spectrums. However, Patent Document 1 does not describe methods for extracting appropriate representative Raman spectrums. Thus Patent Document 1 may include technical problems as in Non Patent Documents.

Exemplary embodiments of the present disclosure relate to providing an optical apparatus that is capable of acquiring representative Raman spectrums with high reliability from hyper spectrum images of samples.

An optical apparatus according to this disclosure: receives a specifying input that specifies a specific Raman spectrum bandwidth as a reference signal; and extracts a Raman spectrum for a measurement point where an intensity of the reference signal is at or above a reference intensity.

With an optical apparatus according to this disclosure, when performing Raman measurement for biological tissues, it is possible to acquire representative Raman spectrums with high reliability, thereby improving reliability of condition evaluations for biological tissues. Technical prob-

DETAILED DESCRIPTION

Regarding Raman Scattering and CARS>

Hereinafter, for the sake of better understanding of this disclosure, CARS will be described as an example of spontaneous Raman scattering and nonlinear Raman. Then details of embodiments of optical apparatus according to this disclosure will be described.

Figure 1:
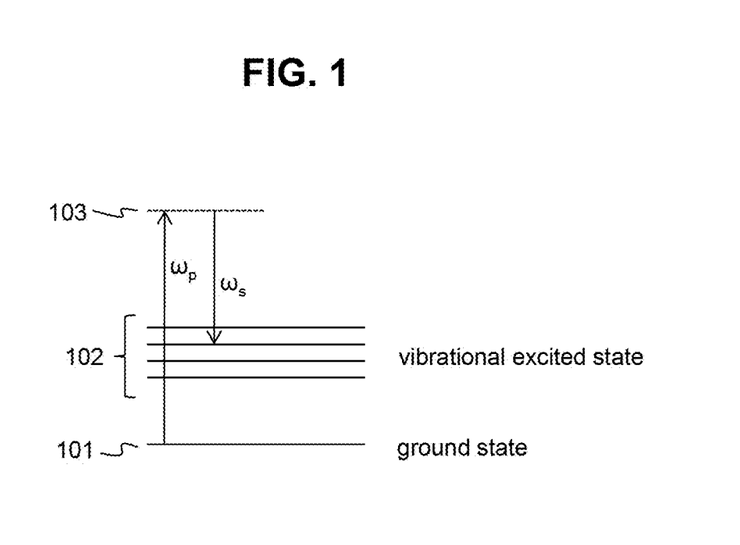
FIG. 1 is an energy level diagram of Stokes scattering in spontaneous Raman scattering.

FIG. 1 is an energy level diagram of Stokes scattering in spontaneous Raman scattering. Raman scattering includes: Stokes scattering in which the frequency is decreased than that of excitation light; and Anti-Stokes scattering in which the frequency is increased than that of excitation light. FIG. 1 shows Stokes scattering only.

In Stokes scattering, the molecule is at a ground state 101 as an initial state. The molecule is excited to an intermediate state 103 by excitation light of frequency $\omega_p$, and then is relaxed to a vibrational excited state 102. When the energy level of the molecule is relaxed from the intermediate state 103 to the vibrational excited state 102, the molecule emits light of frequency $\omega_s$ as scattering light. In Anti-Stokes scattering, the molecule is at the vibrational excited state 102 as an initial state. Then the molecule is relaxed to the ground state 101 via the intermediate state 103. A Raman shift frequency $\Omega$ is described by $\Omega = \omega_p - \omega_s$. The molecule has a plurality of vibrational excited states that are derived from internal chemical bonds. In addition, depending on molecular species, bonds between same types exhibit different vibrational excited states and different transition probabilities by which the molecule transits to that energy level. Accordingly, Raman spectrums are formed that are unique to the molecular species.

The light intensity of scattering light acquired by spontaneous Raman scattering mentioned above is weak, and thus a lot of time is necessary for measurement. However, CARS using nonlinear optical effect increases scattering light intensity. Thus it is possible to perform measurements at video imaging rate. CARS is a third order nonlinear optical effect that uses three types of lasers as excitation light, i.e. pump light, Stokes light, and probe light. In general configurations, the probe light is substituted by the pump light so as to decrease number of light sources, CARS exhibits high intensities due to two factors. The first factor is nonlinear dependence on excitation light intensity. The second factor is coherent molecular excitation. Hereinafter, these factors will be described.

The intensity of CARS light is described by $P_{AS}(\omega_{AS}) \propto |\chi^{(3)} E_P^2(\omega_P) E^*_S(\omega_S)|^2$. $\chi^{(3)}$ is a third order electric susceptibility. $E_P$ is an electric field of pump Sight and probe light. $E_S$ is an electric field of Stokes light. The asterisk of $E_S$ in the equation indicates complex conjugate. Accordingly, CARS light intensity is proportional to second power of pump light and to first power of Stokes light. In spontaneous Raman scattering cases, CW laser is typically used with output power of approximately 10 mW. In CARS where nonlinear Raman occurs, pulse lasers are used with output peak power of approximately 10 MW. Due to nonlinear effect, the signal intensity is increased.

Figure 2:
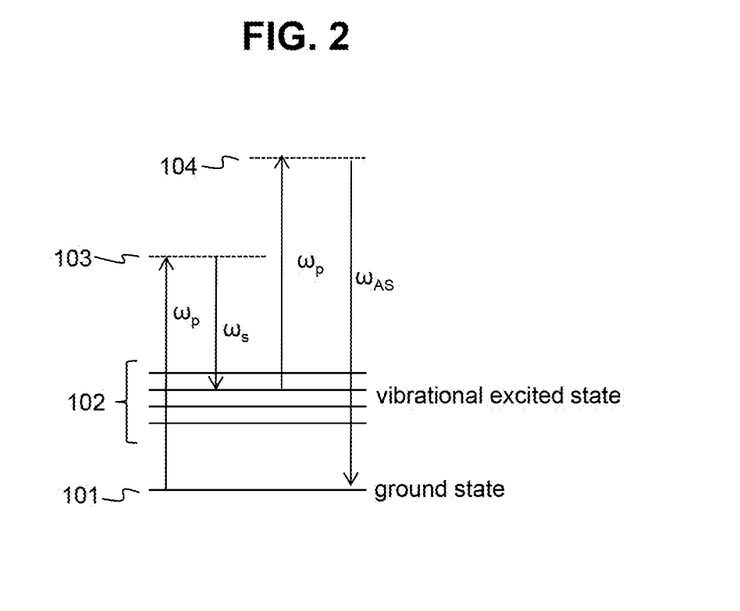
FIG. 2 is an energy level diagram in CARS.

FIG. 2 is an energy level diagram in CARS. Pump light of frequency $\omega_P$ and Stokes light of frequency $\omega_S$ are simultaneously irradiated, thereby the molecule is relaxed to the vibrational excited stale 102 via the intermediate state 103. This relaxation is a stimulated emission that is caused due to forced vibration of molecule by Stokes light. Then the molecule is excited to an intermediate state 104 by probe light of frequency $\omega_P$, and then emits OARS light of frequency $\omega_{AS}$ to be relaxed to the ground state 101. In this way, CARS is involved with stimulated emission, and is capable of exciting multiple molecules coherently and of increasing scattering light intensity. The third order electric susceptibility $\chi^{(3)}$, which contributes to CARS light intensity, is smaller by several digits than the first order electric susceptibility $\chi^{(1)}$, which contributes to spontaneous Raman scattering. However, due to the above-mentioned two factors, CARS exhibits scattering light that is approximately $10^5$ times greater than that of spontaneous Raman scattering.

Embodiment 1: Apparatus Configuration

Figure 3:
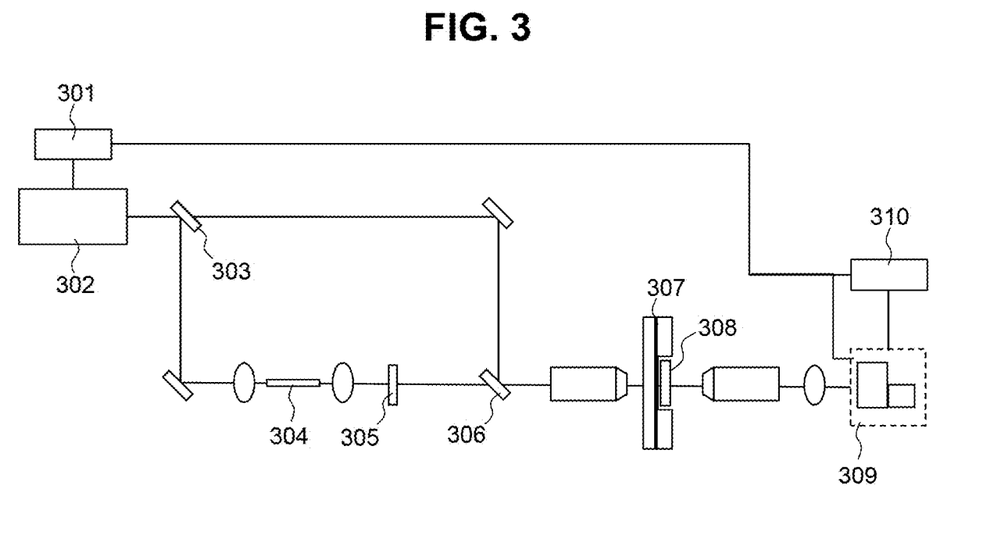
FIG. 3 is a configuration example of an optical apparatus according to an embodiment 1.

FIG. 3 is a configuration example of an optical apparatus according to an embodiment 1 of this disclosure. The optical apparatus includes a controller 301, a Raman optical system (short pulse laser light source 302 to dichroic mirror 306), and an analyzer 310. The controller 301 controls overall operation of the optical apparatus. The Raman optical system will be described below. The analyzer 310 acquires optical images of the sample 308, and performs Raman spectrum analysis on the optical images. Details of the process by the analyzer 310 will be described later. The controller 301 and the analyzer 310 may be configured as a single device. The controller 301 acts as an image acquirer that acquires images of the sample 308, and acts as a selector that selects pixels of hyper spectrum images.

The light emitted from the short pulse laser light source 302 is divided into two light by the beam splitter 303. One of the divided light is guided into an optical fiber such as photonic crystal fiber 304. Wideband light (referred to as supercontinuum light) is generated in the optical fiber. The supercontinuum light exits from the fiber. The long pass filter 305 extracts desired wavelength component only, which is used as Stokes light. Another one of the excitation light and Stokes light are multiplexed by such as the dichroic mirror 306. The multiplexed light is focused and irradiated onto the sample 308, thereby CARS light is generated. The spectroscope 309 detects the CARS light. The analyzer 310 acquires hyper spectrum images and Raman spectrums of the CARS light. The piezo stage 307 finely adjusts the focused position onto the sample 308.

Figure 4:
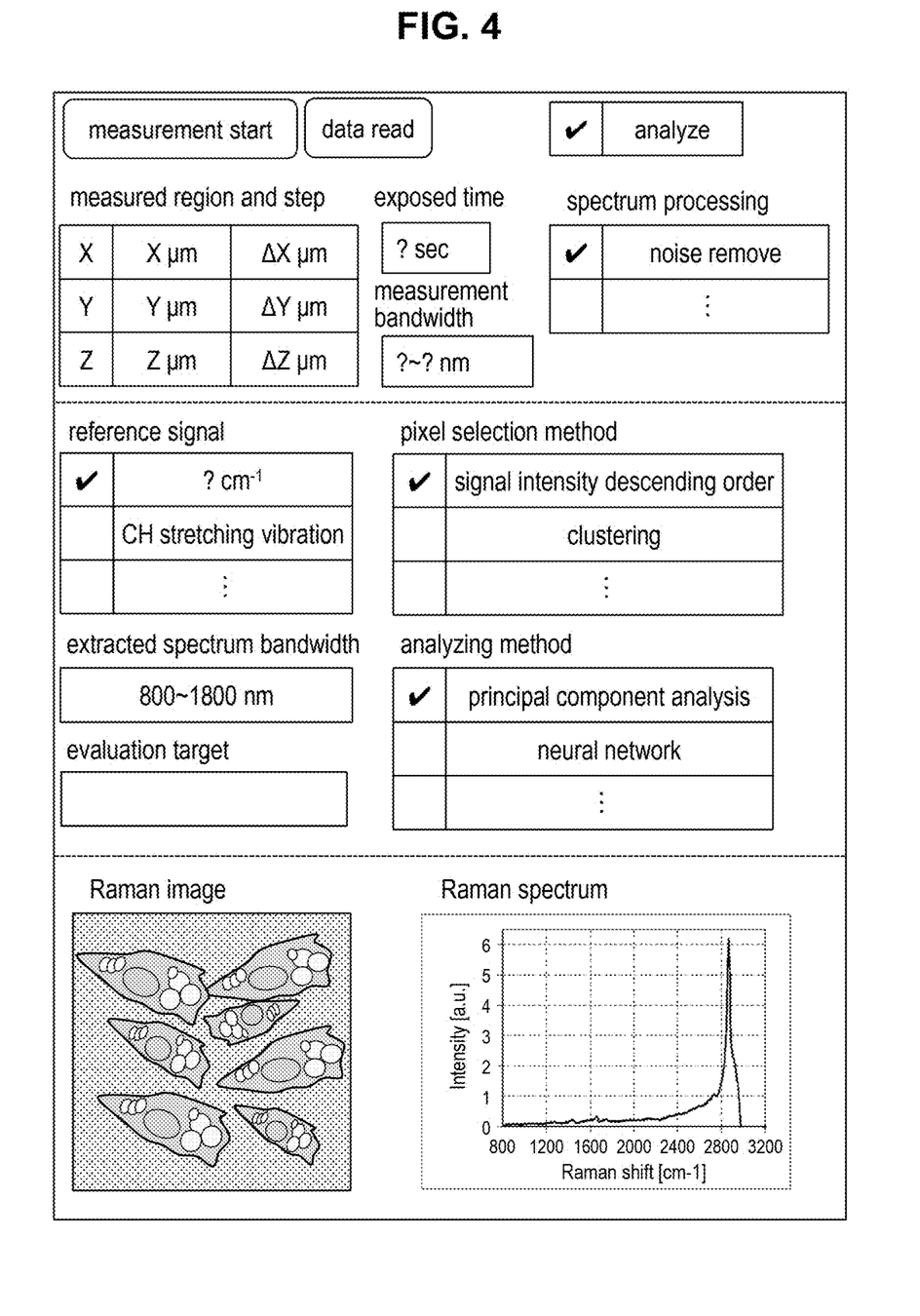
FIG. 4 is a screen example of an user interface provided by a controller 301.

FIG. 4 is a screen example of a user interface provided by the controller 301. The user interface is an interface for users to specify conditions under which the analyzer 310 acquires Raman spectrums of the sample 308. The example shows that the screen interface is used to specify analyzing conditions. Alternatively, other appropriate interfaces may be used to specify those conditions. For example, a data I/O may be used to input data describing analyzing conditions to the analyzer 310. Each item specified by the interface will be described in the flowchart below.

Embodiment 1: Apparatus Operation

Figure 5:
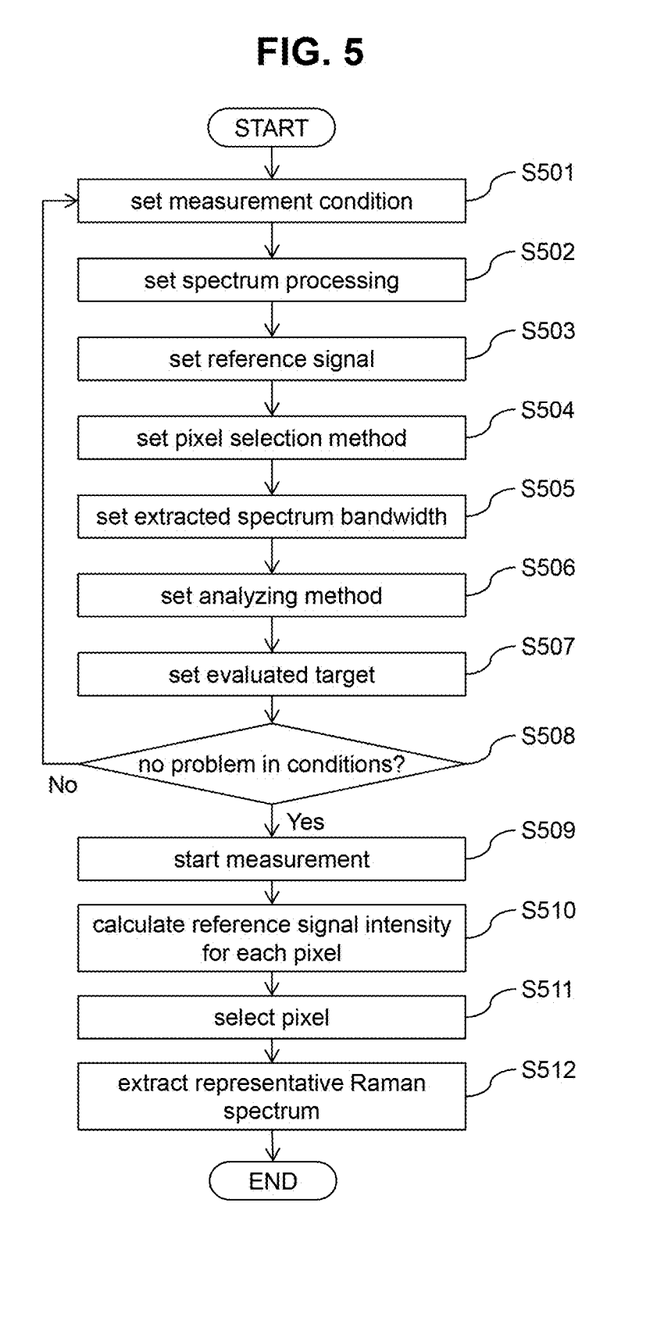
FIG. 5 is a flowchart illustrating a process by the controller 301 to extract a representative Raman spectrum from a sample 308.

FIG. 5 is a flowchart illustrating a process by the controller 301 to extract a representative Raman spectrum from the sample 308. Hereinafter, each step in FIG. 5 will be described.

(FIG. 5: Step S501)

The controller 301 sets measurement conditions according to specifying inputs that are inputted to "measured region and step", "exposed time", and "measurement bandwidth" in the interface shown in FIG. 4.

(FIG. 5: Step S502)

According to specifying inputs that are inputted to "spectrum processing" in the interface shown in FIG. 4, the controller 301 sets the spectrum processing method performed to hyper spectrum images. Examples of spectrum processing include removal or normalization of signals that are detected even when the laser is not irradiated (referred to as dark current).

(FIG. 5: Step S503)

According to specifying inputs that are inputted to "reference signal" in the interface shown in FIG. 4, the controller 301 sets a reference signal that is used when extracting representative Raman spectrum. The reference signal is selected from signals of each bandwidth included in the Raman spectrum that is assumed to have significant characteristics. Examples of Raman spectrum bandwidth that are appropriate for the reference signal will be described later. When specifying the reference signal, a user may input arbitrary Raman shift value (or its range, same applied to below), or a user may select any one of options of Raman spectrum bandwidth stored in the controller 301 in advance.

(FIG. 5: Step S504)

According to specifying, inputs that are inputted to "pixel selection method" in the interface shown in FIG. 4, the controller 301 sets the method for selecting pixels of images of the sample 308. The controller 301 selects pixels in step S511 according to the selected method. When selecting the pixel selection method, a user may select any one of options stored in the controller 301 in advance, or a user may input functions originally created by that user.

(FIG. 5: Step S505)

According to specifying inputs that are inputted to "extracted spectrum bandwidth" in the interface shown in FIG. 4, the controller 301 sets the spectrum bandwidth that will be extracted as the representative Raman spectrum. The controller 301 extracts the selected spectrum region in step S512.

(FIG. 5: Step S506)

According to specifying inputs that are inputted to "analyzing method" in the interface shown in FIG. 4, the controller 301 sets the analyzing method. The controller 301 analyzes the representative Raman spectrum using the specified analyzing method. When selecting the analyzing method, a user may select any one of options stored in the controller 301 in advance, or a user may specify analyzing programs originally created by that user.

(FIG. 5: Step S507)

According to the specifying inputs that are inputted to "evaluation target" in the interface shown in FIG. 4, the controller 301 sets the evaluation target.

(FIG. 5: Step S508)

The controller 301 determines whether each measurement condition specified in steps S501-S507 has some problem. If problems exist, the controller 301 returns to step S501 to let the user specify the measurement conditions again. If no problem exists, the controller 301 proceeds to step S509. Specifically, the controller 301 may determine propriety of measurement conditions according to such as: whether the measurement bandwidth specified in step S501 includes the reference signal specified in step S503; whether the measurement bandwidth specified in step S501 includes spectrum bandwidths of the representative Raman spectrum specified in step S505.

(FIG. 5: Step S509)

Figure 7:
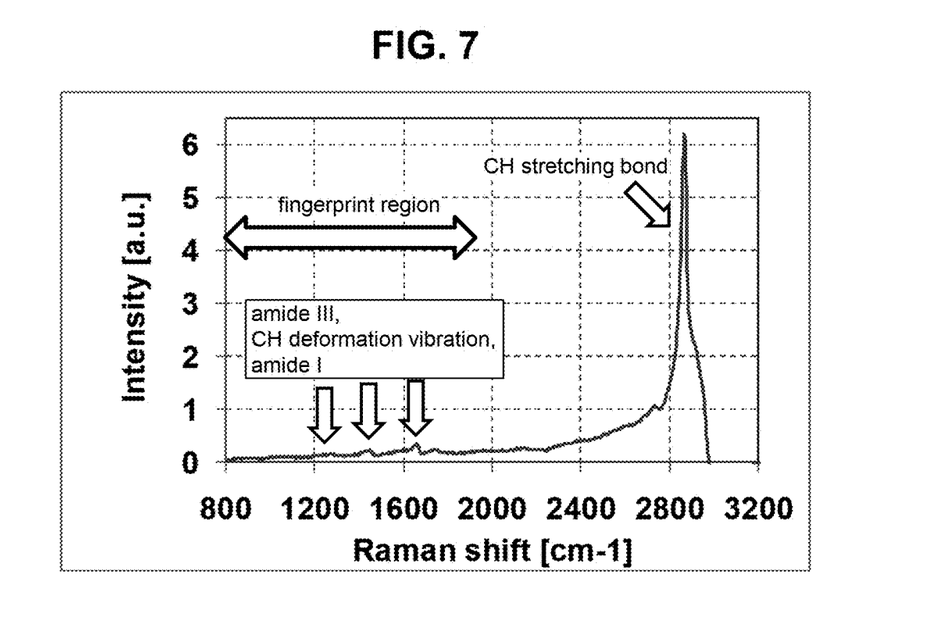
FIG. 7 is an example of CARS spectrum of biological tissues.

The controller 301 scans the measurement light on the sample 308, thereby acquiring hyper spectrum images of the sample 308. When measuring pixel values of the hyper spectrum image, it is possible to acquire Raman spectrums (spectrums across bandwidth range such as shown in FIG. 7) based on the Raman scattering light from the sample 308 for each of measurement points corresponding to each pixel. The controller 301 associates the coordinates of each pixel with the Raman spectrum at that pixel, and stores the coordinates and spectrums.

(FIG. 5: Step S510)

The controller 301 acquires, for each of pixels in the acquired hyper spectrum image, the intensity of the reference signal included in the Raman spectrum. The reference signal in this step corresponds to the Raman spectrum configured in step S503. For example, if CH stretching signal is designated as the reference signal, the controller 301 acquires signal intensities of Raman shift at (or around) 2850 cm$^{-1}$.

(FIG. 5: Step S511)

According to the reference signal intensity acquired in step S510 and the pixel selection method configured in step S504, the controller 301 selects one or more pixels from the hyper spectrum image. The pixel selection method may be such as selecting the specified number of pixels in descending order of the reference signal intensity.

(FIG. 5: Step S512)

The controller 301 averages the Raman spectrums for each of the one or more pixels selected in step S511 across all spectrum bandwidths, for example, thereby extracting the representative Raman spectrum of the sample 308. Other appropriate methods may be applied to calculate the representative Raman spectrum.

(FIG. 5: Step S501-S512: Additional Note)

Figure 8:
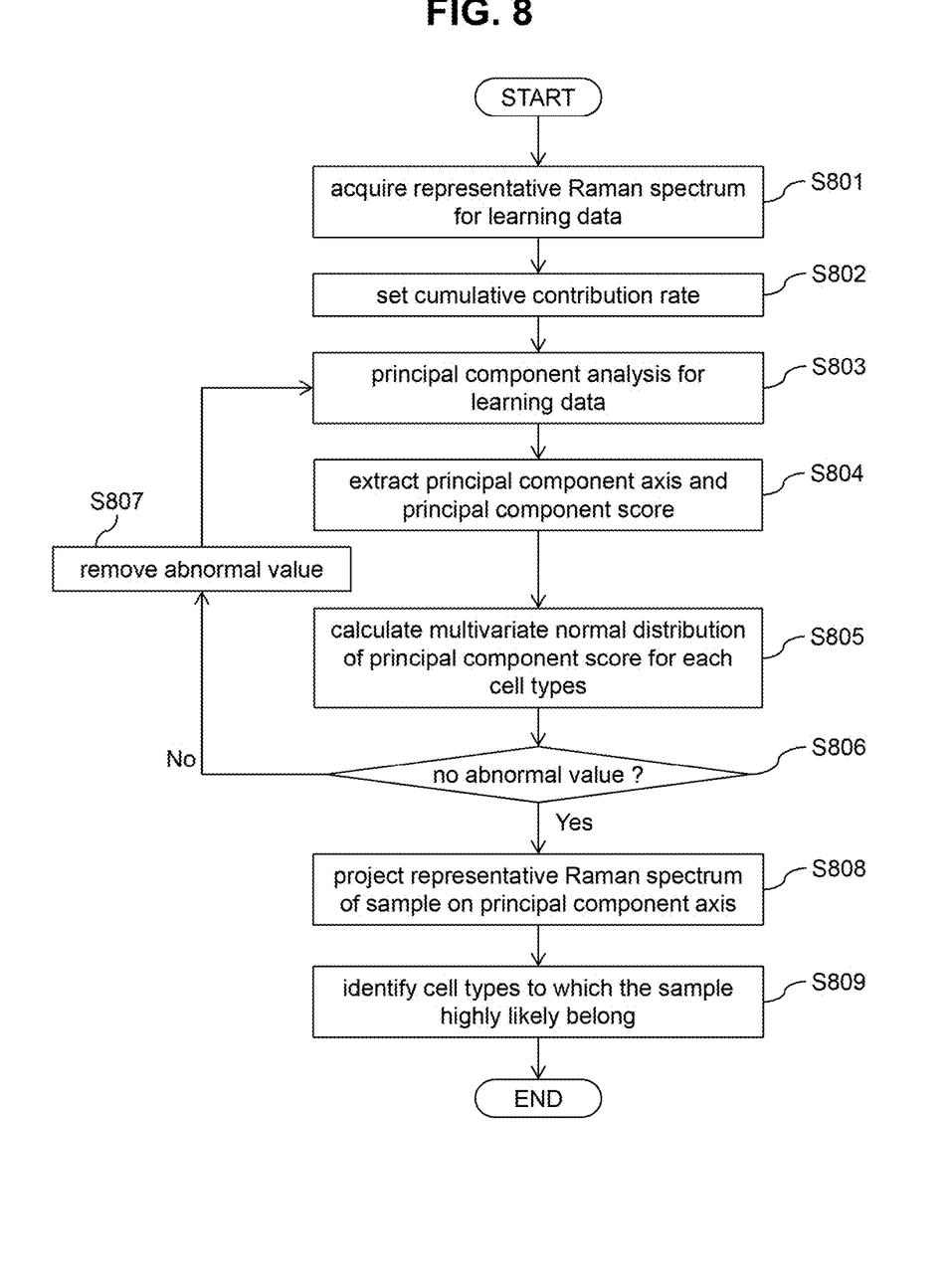
FIG. 8 is a flowchart illustrating a sequence by which an analyzer 310 analyzes a representative Raman spectrum.

If extracting the representative Raman spectrum itself is the objective of this flowchart, it is not necessary to perform the flowchart of FIG. 8 below (it corresponds to the analyzing method in FIG. 4). "analyze" in FIG. 4 specifies whether the flowchart of FIG. 8 is performed, for example.

Figure 6:
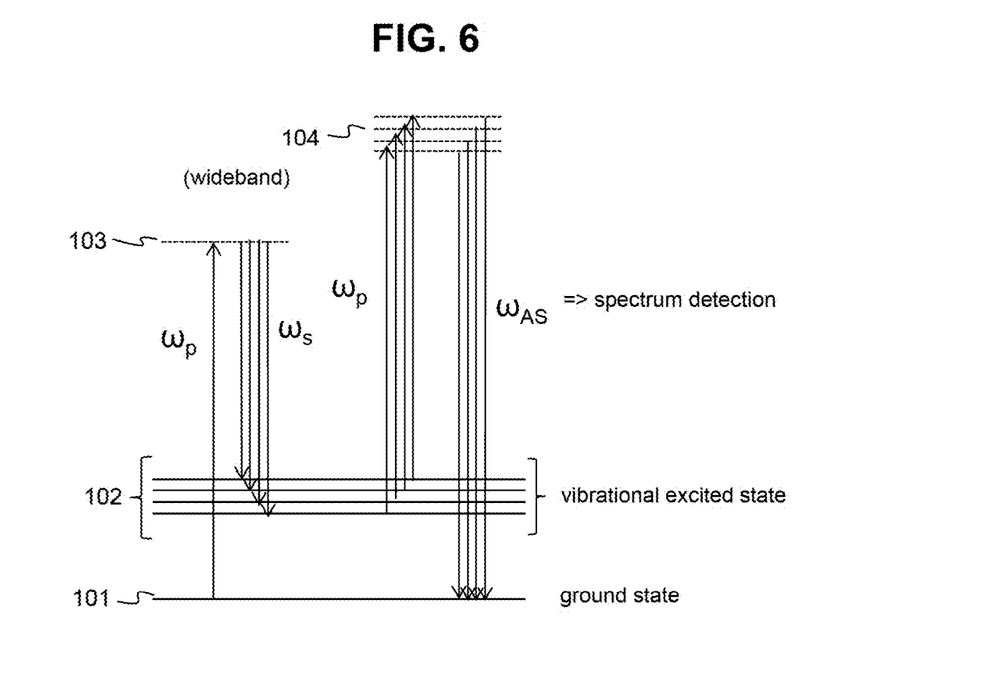
FIG. 6 is an energy level diagram when the optical apparatus according to the embodiment 1 is configured as a transmission multicolor CARS microscope.

FIG. 6 is an energy level diagram when the optical apparatus according to the embodiment 1 is configured as a transmission multicolor CARS microscope. As shown in FIG. 6, multicolor CARS microscope uses a wideband light source as the excitation light, and detects the generated CARS light by spectroscopic detection. In FIG. 6, wideband light is used as Stokes light. Multicolor CARS microscope can estimate Raman spectrums from spectrums of CARS light. Accordingly, it is possible to acquire spectrums at the measured position within shorter time compared to the method in which CARS spectrums are acquired by using single color light as pump light and as Stokes light and by sweeping the wavelength.

FIG. 7 is an example of CARS spectrum of biological tissues. High intensity signal appears around 2850 $cm^{-1}$ that is derived from CH stretching signal. CH stretching signal generally exists in molecules forming biological, tissues such as lipid or protein. Low intensity signals of amide I or amide III appear within 1200 to 1800 $cm^{-1}$ that are derived from protein.

In biological tissue evaluation using Raman, it is beneficial to use fingerprint regions (approximately 800 to 1800 $cm^{-1}$) that contain a lot of information on proteins. In other words, by selecting preferable pixels using Raman spectrums in the fingerprint region as the reference signal it is supposed that appropriate representative Raman, spectrum will be extracted. However, since the signal intensity is low in the fingerprint region, it is difficult to use such signal for tissue evaluation.

CH stretching signal and signals in the fingerprint region both have common signal source, i.e. protein. Thus it is assumed that the signal intensities of those signals have certain correlation. Then CU stretching Signal with high signal intensity is used as the reference signal, and the fingerprint region is extracted as the representative Raman spectrum, for example. By selecting pixels where CM stretching signal appears significantly, it is supposed that preferable representative Raman spectrum will be extracted because such pixels also have significant characteristics in the fingerprint region.

When users utilize the theory above, users specify CH stretching signal as the reference signal, and specify as the pixel selection method that a plurality of reference signal intensities is selected in descending order, via the interlace of FIG. 4. The spectrum region extracted as the representative Raman spectrum may not be necessarily all of the bandwidth of the acquired Raman scattering light. For example, users may input to "extracted spectrum bandwidth" so that 800-1800 $cm^{-1}$ corresponding to the fingerprint region will be extracted as the representative Raman spectrum among Raman spec t rums of each pixel selected in step S511.

FIG. 8 is a flowchart illustrating a sequence by which the analyzer 310 analyzes the representative Raman spectrum. The analyzer 310 compares the representative Raman spectrum of the sample 308 acquired by the flowchart of FIG. 5 with a Raman spectrum acquired from previously measured samples, thereby identifying physical characteristics of the sample 308. Now it is assumed that the sample 308 is a biological sample. The cell types of the sample 308 will be identified as physical characteristics of the sample 308. Hereinafter, each step in FIG. 8 will be described.

(FIG. 8: Step S801)

The analyzer 310 acquires data (learning data) that describes Raman spectrums acquired by previously measuring biological samples which cell types are already clear. A plurality of the learning data could be prepared for one cell type.

(FIG. 8: Step S802)

The analyzer 310 compares the representative Raman spectrum of the sample 308 with the learning data, using the method specified by "analyzing method" in FIG. 4 (principal component analysis in this example). Raman spectrum represents signal intensities of Raman shift across a certain bandwidth range. By comparing with each other the components within that bandwidth range well representing the characteristics of the Raman spectrum as principal component, it is possible to determine similarity between Raman spectrums. In this step, cumulative contribution ratio (typically 70-80%) is set as parameters of principal component analysis. For example, if the cumulative contribution ratio is 80%, the component that best describes the characteristics of the Raman spectrum is firstly employed as the principal component. Then the next contributive component is employed as the principal component. Similar process is repeated until the cumulative contribution ratio reaches 80%.

(FIG. 8: Steps S803-S804)

The analyzer 310 performs principal component analysis for all of the learning data (S803), thereby calculating principal components described by each of the learning data and calculating principal component scores of each principal component (S804).

(FIG. 8: Step S805)

Assuming that each principal component calculated in step S804 follows normal distribution in each principal component axis, the analyzer 310 calculates normal distribution of each principal component score. The acquired distribution will be multivariate normal distribution.

(FIG. 8: Steps S806-S807)

The analyzer 310 determines whether the learning data includes abnormal values (S806) For example, data points may be deemed as abnormal values when they are significantly deviated from the multivariate normal distribution calculated in step S805. If the learning data includes abnormal values, the analyzer 310 removes the abnormal values and then returns to step S803 (S807). If the learning data does not include abnormal values, the analyzer 310 proceeds to step S808.

(FIG. 8: Step S808)

The analyzer 310 projects the representative Raman spectrum of the sample 308 on the principal component axis calculated in step S804, thereby calculating principal component scores in each principal component axis.

(FIG. 8: Step S809)

The analyzer 310 compares the multivariate normal distribution calculated in step S805 with the principal component score of the sample 308 calculated in step S808, thereby identifying the distribution to which the Raman spectrum of the sample 308 most likely belongs. Accordingly, it is possible to identity that the cell type of the sample 308 is a cell type corresponding to the learning data that has the identified distribution.

Figure 9:
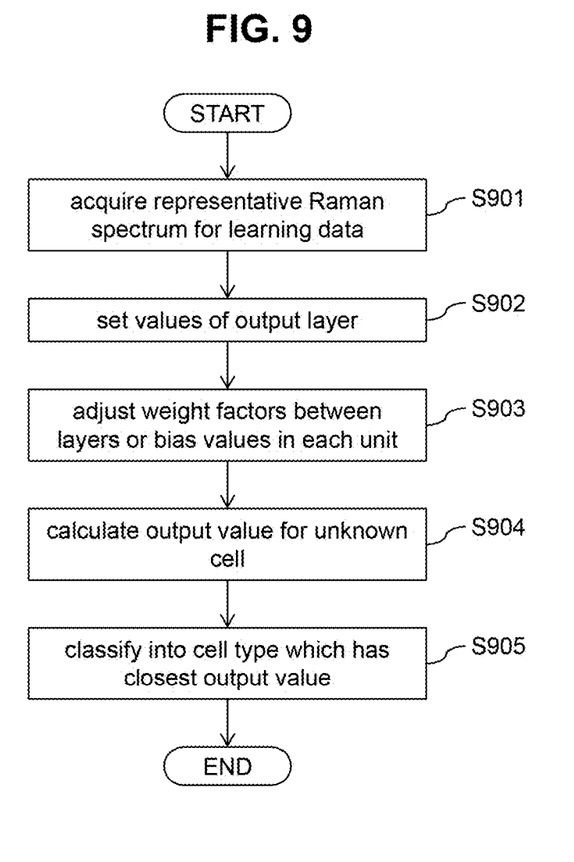
FIG. 9 is a flowchart illustrating another sequence by which an analyzer 310 analyzes a representative Raman spectrum.

FIG. 9 is a flowchart illustrating another sequence by which the analyzer 310 analyzes the representative Raman spectrum. The analyzer 310 may use any analyzing method as long as it is possible to compare the representative Raman spectrum of the sample 308 with the learning data. This example uses neural network.

(FIG. 9: Step S901)

This step is identical to step S801.

(FIG. 9: Step S902)

The analyzer 310 configures values of the output layer of the neural network for each of cell types.

(FIG. 9: Step S903)

The analyzer 310 gives Raman spectrums of learning data to the input layer of the neural network. The analyzer 310 then adjusts weight factors between layers and bias values of each neuron in the neural network, so that proper values will be outputted from the output layer that represent the cell type corresponding to the inputted learning data. This step corresponds to learning of the neural network. Steps S902-S903 may be performed in advance.

(FIG. 9: Step S904)

The analyzer 310 inputs the representative Raman spectrum of the sample 308 into the neural network that has already learned the learning data, thereby acquiring output values.

(FIG. 9: step S905)

The analyzer 310 compares the acquired output value with the output value of each cell type configured in step S902, thereby identifying the output value of cell type that is most similar to the acquired output value using the preconfigured calculation method. The analyzer 310 can determine that the cell type of the sample 308 is the cell type corresponding to the identified value.

(FIG. 9: Step S904: Additional Note)

The representative Raman spectrum of the sample 308 itself may be given to the input layer of the neural network. Alternatively, the given dam may be appropriately processed before given to the neural network. For example, average signal intensity may be subtracted from, the data, or the data may be scaled. Alternatively, scores or weight factors may be inputted to the neural, network that are acquired by compressing process using low order and low rank approximation such as principal component analysis or non-negative matrix factorization. Thereby if is possible to decrease the number of nodes of the input layer compared to the case where the spectrum is inputted to the input layer without being processed in advance. The number of layers or the number of nodes may also be appropriately adjusted. These parameters effect on convergence of learning/calculation time/identified result. Thus these parameters may be tested in advance to select the best method.

Figure 10:
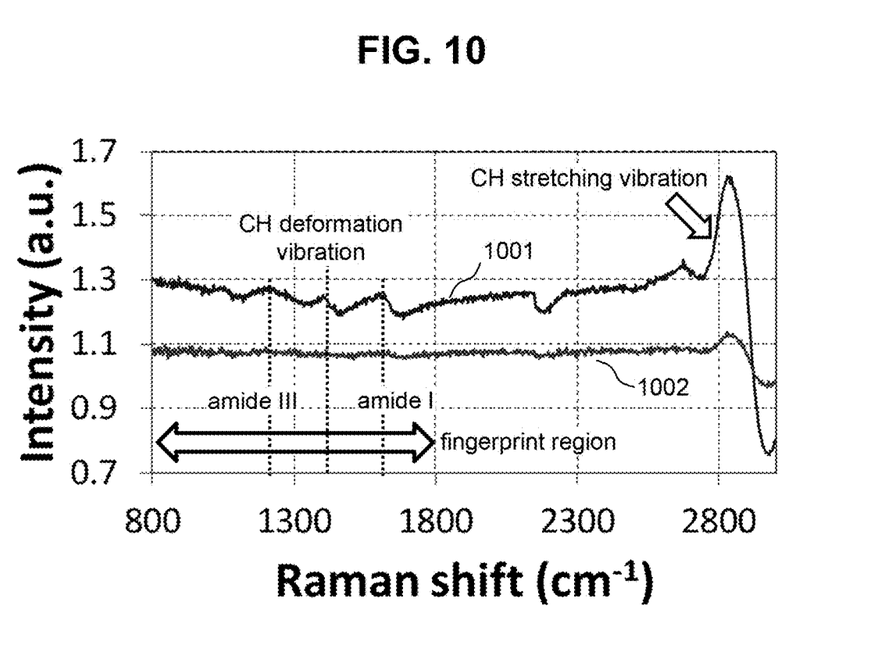
FIG. 10 is an example of Raman spectrum, acquired by the embodiment 1.

FIG. 10 is an example of Raman spectrum acquired by the embodiment 1. The reference sign 1001 is the Raman spectrum acquired by the embodiment 1. The reference sign 1002 is a Raman spectrum extracted around the center of cell using conventional bright field images. The conventional technique can hardly acquire signals in the fingerprint region. On the other hand, the embodiment 1 can acquire signals of amide III, CH deformation, amide I, and the like in the fingerprint region.

Figure 11:
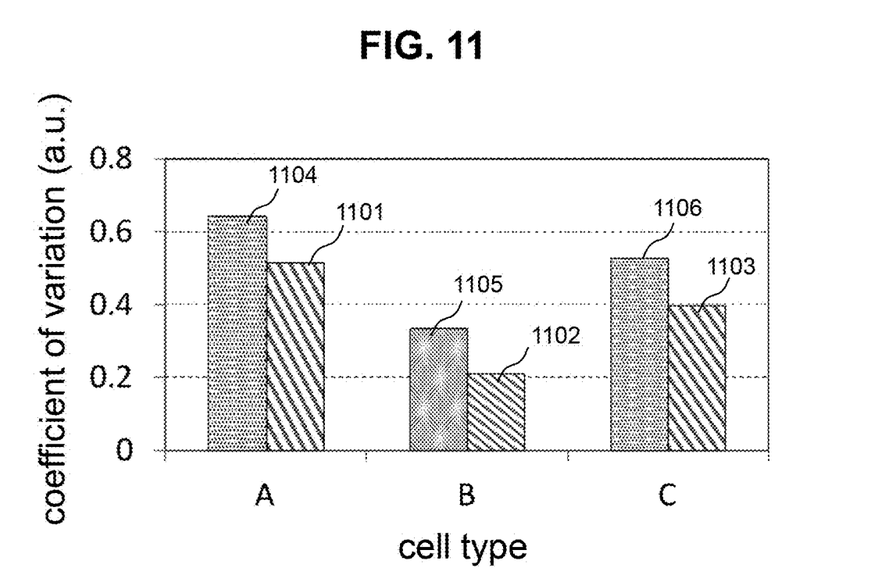
FIG. 11 is a graph illustrating coefficients of variation of signal intensities of amid I between same cell types.

FIG. 11 is a graph illustrating coefficients of variation of signal intensities of amid I between same cell types. The reference signs 1101-1103 are coefficients of variation in the representative Raman spectrum extracted by the embodiment 1. The reference signs 1104-1106 are coefficients of variation in the representative Raman spectrum extracted by conventional bright field images around cell center. The embodiment 1 has coefficients of variation smaller than those of the conventional technique for all cell types. This indicates that stable signal intensities are acquired between same cell types.

Figure 12:
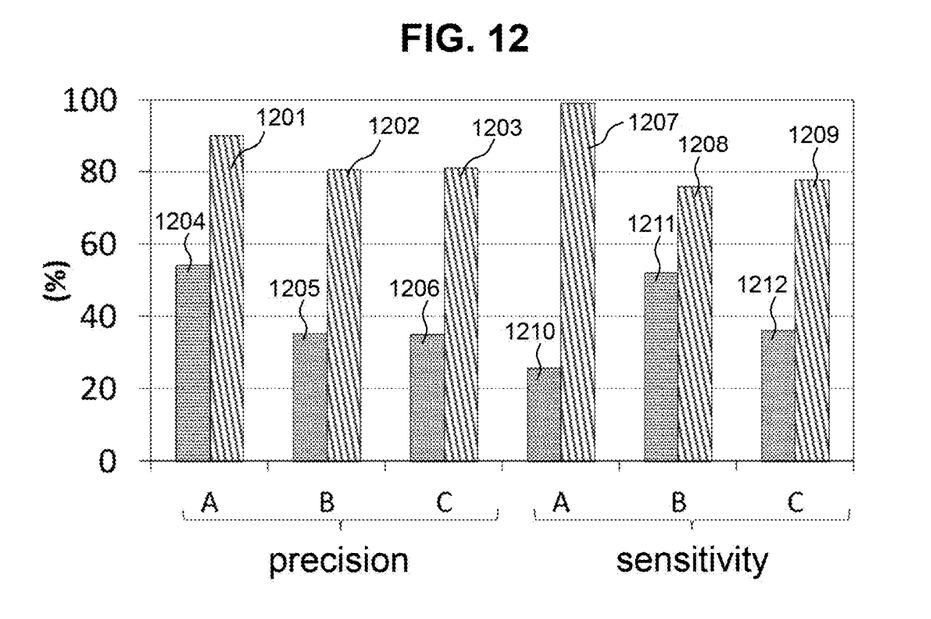
FIG. 12 is a graph illustrating a result in which cell types are identified by principal component analysis shown in FIG. 8.

FIG. 12 is a graph illustrating a result in which cell types are identified by principal component analysis shown in FIG. 8. Precision and sensitivity are used as evaluation indicators. Precision is a ratio of data counts which are evaluated as belonging to a classification and which truly belong to that classification. Sensitivity is a ratio of data counts which truly belong a classification and which are evaluated as belonging to that classification. Definitions of precision and sensitivity will be described again using FIG. 13.

The reference signs 1201-1203 and the reference signs 1207-1209 are precisions and sensitivities acquired by the embodiment 1. The reference signs 1204-1206 and the reference signs 1210-1212 are precisions and sensitivities acquired by the conventional technique. The embodiment 1 has improved precision and sensitivity compared to the conventional technique for all cell types.

Figure 13:
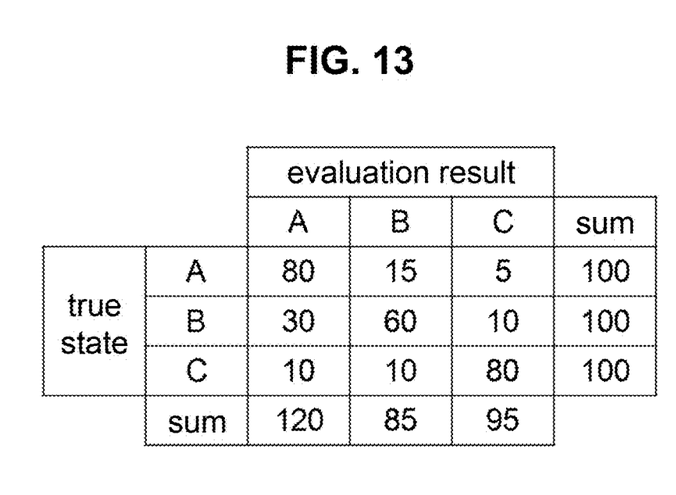
FIG. 13 is a table illustrating an example of precision and sensitivity.

FIG. 13 is a table illustrating an example of precision and sensitivity. Among 120 pieces of data classified as cell type A, 80 pieces of data are truly cell type A. Thus the precision is 80/120×100=67%. Among 100 pieces of data that are truly cell type A, 80 pieces of data are classified as cell type A. Thus the sensitivity is 80/100×100=80%.

Figure 14:
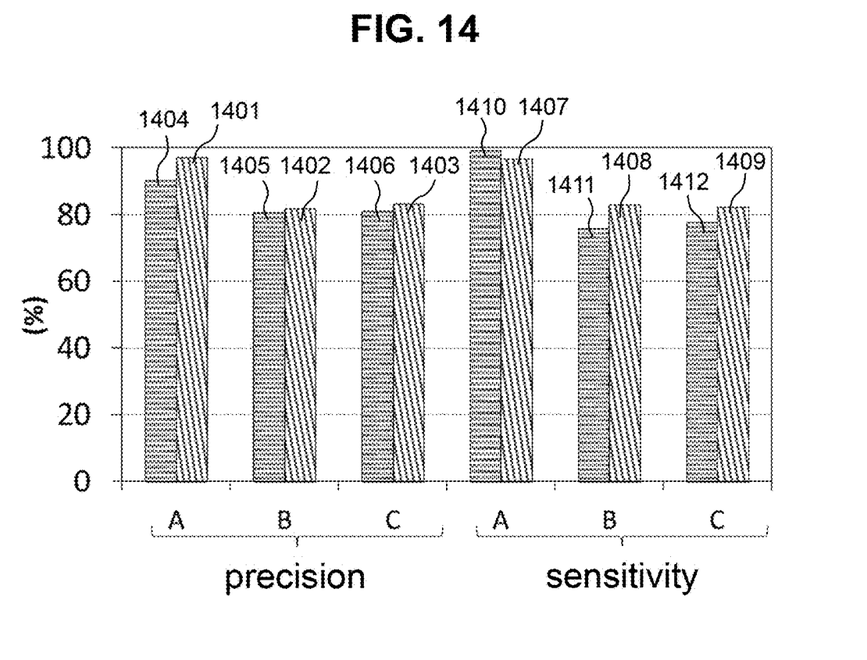
FIG. 14 is a graph illustrating a result in which cell types are identified by neural network shown In FIG. 9.

FIG. 14 is a graph illustrating a result in which cell types are identified by neural network shown in FIG. 9. The reference signs 1401-1403 and the reference signs 1407-1409 are precisions and sensitivities in the case of neural network. The reference signs 1404-1406 and the reference signs 1410-1412 are precisions and sensitivities in the case of principal component analysis shown in FIG. 12. As shown in FIG. 14, precision and sensitivity are improved depending on the analyzing method.

The neural network used in the analysis of FIG. 14 is a feedforward network comprising input layer/first hidden layer/second hidden layer/output layer. The number of nodes in the input layer is 432. The number of nodes in the first hidden layer is 60. The number of nodes in the second hidden layer is 35. The number of nodes in the output layer is 3. The transfer functions in the first and the second hidden layers are sigmoid functions. The transfer function in the output layer is soft max function. The values of three nodes in the output layer during learning process are (1, 0, 0), (0, 1, 0), (0, 0, 1) for each of cell types A, B, and C. Cell types were identified by the portion that has a maximum value outputted for unknown spectrums. For example, if the value of the output layer is (0.05, 0.8, 0.15), the inputted spectrum corresponds to cell type B associated with (0, 1, 0) during learning process, because the second node has the maximum value.

Embodiment 1: Summary

The optical apparatus according to the embodiment 1 uses CH stretching signals as the reference signal, thereby selecting pixels where substances forming biological tissues are intensively distributed, and extracting fingerprint regions that have high intensities and that have stable shapes and signal intensities. Accordingly, it is possible to improve analysis accuracy.

Embodiment 2

The embodiment 1 selects a plurality of pixels in descending order of reference signal intensity. An embodiment 2 of this disclosure performs clustering according to similarity of spectrum of hyper spectrum image, and extracts representative Raman spectrums from clusters which have large average value of reference signal, intensity. The configuration of the optical apparatus is same as in the embodiment 1. Thus the differences will be mainly described below. The similarity of spectrum in the clustering may be calculated, in the wavenumber regions such as all wavenumber regions including the wavenumber of the reference signal. Alternatively, the similarity may be calculated in specific wavenumber regions such as the fingerprint region. For example, CH stretching signal with high signal intensify may be used, as the reference signal, and the spectrum similarity in clustering may be calculated in the fingerprint region. A cluster that has strong CH stretching signal is selected among clusters acquired by the clustering process, and an average spectrum of the selected cluster may be employed as the representative spectrum. In this way, the clustering process Is performed according to the similarity in the fingerprint region having weak signal intensity without being effected from CH stretching signal having strong signal intensity during the clustering process. Thus it is possible to calculate the representative spectrum with high quality.

Figure 15:
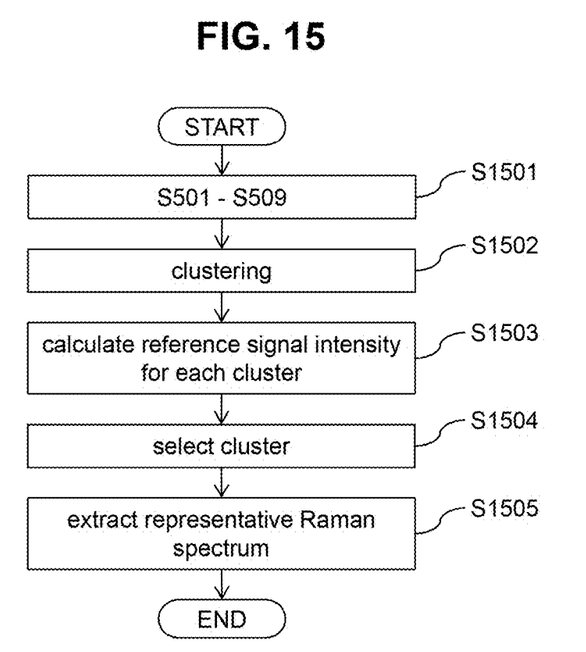
FIG. 15 is a flowchart illustrating a process by the controller 301 to extract a representative Raman spectrum from the sample 308 in an embodiment 2.

FIG. 15 is a flowchart illustrating a process by the controller 301 to extract the representative Raman spectrum from the sample 308 in the embodiment 2. Hereinafter, each step in FIG. 15 will be described.

(FIG. 15: Step S1501)

The controller 301 performs processes similar to steps S501-S509. Note that "clustering" is selected as the pixel selection method of step S504 in the embodiment 2. Clustering method, spectrum bandwidths and similarity used in clustering, and number of clusters are also specified in step S504. When specifying these parameters, users may select any one of options stored in the controller 301 in advance. Alternatively, users may specify functions originally created by that user. For example, k-means clustering may be used as the clustering method, and cosine distance may be used as the similarity.

(FIG. 15: Step S1502)

The controller 301 performs, on the hyper spectrum image of the sample 308, conversion from spectrum bandwidths specified in step S505 into unit vectors, for each of pixels. The controller 301 uses the spectrum converted into unit vectors to calculate cosine distances between each pixel, and performs clustering process on each pixel using k-means clustering.

(FIG. 15: Step S1503-S1504)

The controller 301 calculates average reference signal intensities of each cluster (S1503). The controller 301 selects a cluster that, has highest value of average reference signal intensity calculated in step S1503 (S1504).

(FIG. 15: step S1505)

The controller 301 extracts, as the representative Raman spectrum, an average spectrum of specified spectrum bandwidths in the cluster selected in step S1504.

Embodiment 2: Summary

The optical apparatus according to the embodiment 2 performs clustering process on pixels which have similar spectrum shapes, thereby extracting the representative Raman spectrum from portions that have similar material distributions. Accordingly, it is possible to suppress variations of representative Raman spectrums between biological tissues in same state In addition, by adding and averaging similar spectrums, signals with low intensity could be increased. Thus it is possible to evaluate biological tissues with high reliability.

Embodiment 3

Considering the spatial distance between pixels, an embodiment 3 of this disclosure selects pixels from which the representative Raman spectrum is extracted. The configuration of the optical apparatus is same as in the embodiment 1. Thus the differences will be mainly described below.

Figure 16:
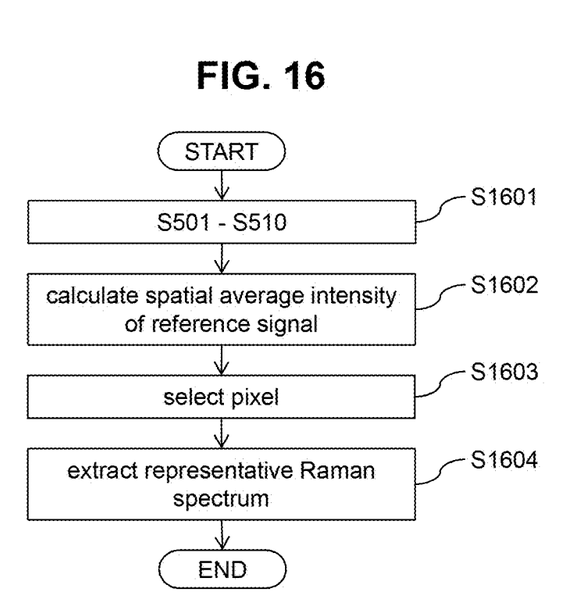
FIG. 16 is a flowchart illustrating a process by the controller 301 to extract a representative Raman spectrum from the sample 308 in an embodiment 3.

FIG. 16 is a flowchart illustrating a process by the controller 301 to extract the representative Raman spectrum from the sample 308 in the embodiment 3. Hereinafter, each step in FIG. 16 will be described.

(FIG. 16: Step S1601)

The controller 301 performs processes similar to steps S501-S510. Note that "select a plurality of pixels in descending order of spatial average intensity of reference signal" is Specified as the pixel selection method of step S504 in the embodiment 3. k (x) and n described in the next step are also specified.

(FIG. 16: Step S1602)

The controller 301 calculates spatial average intensities of Raman spectrums for each pixel, according to equation "$I_{AV}=\Sigma(k(x)*I)/n$". $I_{AV}$ is a spatial average intensity. k (x) is a function of distance x from the pixel of interest, k (x) becomes smaller as x becomes larger. I is a reference signal intensity of each pixel. n is a number of pixels to be added. This step is for averaging the reference signal intensities of surrounding pixels using weight factors, thereby calculating the reference signal intensity with spatial expansion being taken into account. In addition, it is possible to adjust the balance of reference signal intensity and special distance between pixels, according to functional shape of k (x). The equation is one of examples. Other equations may be used as long as being capable of calculating spatial average intensity.

(FIG. 16: Step S1603)

The controller 301 selects one or more pixels in descending order of spatial average intensity calculated in step S1602, for example.

(FIG. 16: Step S1604)

The controller 301 averages Raman spectrums of each of one or more pixels selected in step S1603 using equations similar to that of step S1602 with weight factors, thereby extracting the representative Raman spectrum.

Embodiment 3: Summary

The optical apparatus according to the embodiment 3 selects pixels that are spatially close to each other and that have strong reference signal intensities. Accordingly, the optical apparatus is suitable for extracting representative Raman spectrums from spatially localized portions such as minute organs in a single cell. The method using spatial average intensity may also be used when calculating signal intensities of each cluster in the embodiment 2.

The embodiment 2 performs clustering process, calculates reference signal intensities for each cluster, and selects a cluster that has highest reference signal. The reference signal intensity for each cluster may be calculated by average intensity of reference signals of spectrums belonging to a same cluster. Alternatively, the reference signal intensity for each cluster may be selected using the equation of spatial average intensity described above. In the latter case: the spatial average intensity is calculated by $I_{AV}$ above at pixels classified into same clusters; a cluster having highest spatial average intensity is selected; the representative spectrum may be calculated from spectrums classified into that cluster. In this way, by combining the embodiments 2 and 3, clusters are selected while taking into account spatial densities of pixels forming clusters. Thus it is possible to calculate the representative spectrum from spectrums that are similar to each other within the designated wavenumber range and that are spatially close to each other. Then it is possible to acquire more reliable representative spectrums.

Modification of the Present Disclosure

The present disclosure is not limited to a form of the above-described embodiments, but also includes various modifications. The above embodiments have been described in detail for the purpose of easy explanation of the present disclosure, and are not necessarily limited to that provided with all the described configurations. Moreover, a part of a configuration of one embodiment can be replaced with a configuration of another embodiment. Further, a configuration of one embodiment can be added with a configuration of another embodiment. Furthermore, a part of a configuration of each embodiment can be added, deleted, or replaced with another configuration.

In the embodiments above, transmission multicolor CARS microscope is used as Raman optical apparatus. This disclosure may be applied to any apparatus as long as being capable of acquiring Raman scattering light. For example, this disclosure may be applied to microscopes other than CARS microscope regardless of transmission type or reflection type, such as spontaneous Raman scattering microscope or SRS microscope. This disclosure is not limited to multicolor type using wideband light, and may be applied to wavelength sweep type that varies wavelength of excitation light.

The embodiments above extract fingerprint regions using CH stretching signal as the reference signal. Signals other than CH stretching signal may be employed as the reference signal such signals including: (a) Raman shift derived from materials characteristic to desired tissues such as nucleus; (b) Raman shift having intensities more than predetermined thresholds in the fingerprint region. It may be possible to acquire signals from specific cell organelle by using (a). It may be possible to acquire signals from portions where specific proteins are localized by using (b).

The embodiments above select pixels, and then extract representative Raman spectrums from the fingerprint region of those pixels. Other regions may be extracted such as CH stretching signals. In this case, a single signal is used to perform analysis. Thus it is necessary to precisely acquire Raman shifts or peak width of signals. In other words, it is necessary to acquire stable representative Raman spectrums. Thus this disclosure is beneficial.

The embodiments above simultaneously perform a process to analyze learned data and a process to analyze representative Raman spectrums acquired from the sample 308. By finishing analysis on the leaned data in advance, it is possible to reduce analyzing time to evaluate the sample 308 in real-time basis. When evaluating temporal variations such as drag effect or cell metabolism, such real time evaluation is beneficial.

The embodiments above identify cell types as physical characteristics of the sample 308. This disclosure may be applied when identifying other physical characteristics. For example, tins disclosure may be applied to such as: (a) determining whether a cell is suffering from cancer; (b) identifying cancer types; (c) determining whether ES cells or iPS cells are indifferent or not.

In the embodiments above, the controller 301 and the analyzer 310 may be configured using hardware such as circuit devices implementing functionalities thereof. Alternatively, the controller 301 and the analyzer 310 may be configured using software implementing functionalities thereof executed by processors such as CPU (Central Processing Unit).

DESCRIPTION OF SYMBOLS

301: controller
302: short pulse laser light source
303: beam splitter
304: photonic crystal fiber
305: long pass filter
306: dichroic mirror
307: piezo stage
308: sample
309: spectroscope
310: analyzer

What is claimed is:

1. An optical apparatus comprising:
   a light source that irradiates light onto a sample;
   a controller configured to:
      acquire an image of the sample using a signal acquired by irradiating the light onto the sample;
      provide a user interface that receives a specifying input specifying, as a reference signal, a specific Raman spectrum bandwidth of Raman scattering light acquired by irradiating the light onto the sample;
      select, among measurement points of the image, a measurement point where the reference signal has an intensity at or above a reference intensity; and
      extract a Raman spectrum of Raman scattering light from the sample at the measurement point.

2. The optical apparatus according to claim 1,
   wherein the controller acquires measured data that describes a Raman spectrum of Raman scattering light acquired by irradiating light onto a known measured sample, and
   wherein the controller compares the extracted Raman spectrum with a Raman spectrum described in the measured data, thereby identifying a physical characteristic of the sample according to a physical characteristic described in the measured data.

3. The optical apparatus according to claim 2,
   wherein the controller:
      performs a principal component analysis on the measured data and the extracted Raman spectrum, thereby identifying a physical characteristic of the sample; or
      inputs the extracted Raman spectrum into a neural network constructed in advance using the measured data, thereby identifying a physical characteristic of the sample.

4. The optical apparatus according to claim 1,
   wherein the user interface receives, as the reference signal, the specifying input that specifies a Raman spectrum bandwidth derived from a CH stretching vibration, and
   wherein the controller selects a measurement point where a Raman spectrum in a Raman spectrum bandwidth specified by the specifying input has an intensity at or above the reference intensity.

5. The optical apparatus according to claim 1,
wherein the user interface receives, as the reference signal, the specifying input that specifies a Raman spectrum derived from a material unique to a specific tissue, and
wherein the controller selects a measurement point where a Raman spectrum specified by the specifying input has an intensity at or above the reference intensity.

6. The optical apparatus according to claim 1,
wherein the user interface receives, as the reference signal, the specifying input that specifies a Raman spectrum bandwidth in a fingerprint region of Raman scattering light, and
wherein the controller selects a measurement point where a Raman spectrum in a Raman spectrum bandwidth specified by the specifying input has an intensity at or above the reference intensity.

7. The optical apparatus according to claim 1,
wherein the controller selects a plurality of measurement points where the reference signal has an intensity at or above a reference intensity in descending order of intensity of the reference signal.

8. The optical apparatus according to claim 1,
wherein the controller configured to select performs a clustering process on each of the measurement points according to a similarity between Raman spectrums at each of the measurement points, thereby classifying each of the measurement points into one or more clusters,
wherein the controller configured to select calculates an average intensity of the reference signal at each of the measurement points belonging to each of the clusters, and
wherein the controller configured to select selects the measurement point that belongs to the cluster where the average intensity is at or above the reference intensity.

9. The optical apparatus according to claim 1,
wherein the controller configured to select selects the measurement point in a spatial region where a spatial average intensity of the reference signal is at or above the reference intensity.

10. The optical apparatus according to claim 1,
wherein the user interface is configured as a user interface for a user of the optical apparatus to input the specifying input.

11. An optical apparatus comprising:
a light source that irradiates light onto a sample;
a controller configured to:
acquire an image of the sample using a signal acquired by irradiating the light onto the sample;
provide a user interface that receives a specifying input specifying, as a reference signal, a Raman shift or a Raman shift range of Raman scattering light acquired by irradiating the light onto the sample;
select, among measurement points of the image, a measurement point where the reference signal has an intensity at or above a reference intensity;
extract a Raman spectrum of Raman scattering light from the sample at the measurement point; and
output a processed result by the controller.

12. The optical apparatus according to claim 11,
wherein the controller acquires measured data that describes a Raman spectrum of Raman scattering light acquired by irradiating light onto a known measured sample,
wherein the controller compares the extracted Raman spectrum with a Raman spectrum described in the measured data, thereby identifying a physical characteristic of the sample according to a physical characteristic described in the measured data, and
wherein the controller outputs the processed result that describes a cell type of the sample identified by the controller.

13. The optical apparatus according to claim 12,
wherein the measured data describes, as the measured sample, Raman spectrums for each of cell types,
wherein the controller identifies, as a physical characteristic of the sample, a cell type of the sample according to a physical characteristic described in the measured data, and
wherein the controller outputs the processed result that describes a cell type of the sample identified by the controller.

14. An optical measurement method comprising:
a step of irradiating light onto a sample;
an image acquiring step of acquiring an image of the sample using a signal acquired by irradiating the light onto the sample;
an inputting step of receiving a specifying input specifying, as a reference signal, a Raman shift or a Raman shift range of Raman scattering light acquired by irradiating the light onto the sample;
a selecting step of selecting, among measurement points of the image, a measurement point where the reference signal has an intensity at or above a reference intensity; and
a spectrum analyzing step of extracting a Raman spectrum of Raman scattering light from the sample at the measurement point.

* * * * *